(12) United States Patent
Oyman et al.

(10) Patent No.: US 7,623,589 B2
(45) Date of Patent: Nov. 24, 2009

(54) COOPERATIVE MULTIPLE-ACCESS USING USER-CLUSTERING AND SPACE-TIME-FREQUENCY CODING TECHNIQUES FOR HIGHER RELIABILITY RECEPTION

(75) Inventors: Ozgur Oyman, Palo Alto, CA (US); Sumeet Sandhu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 717 days.

(21) Appl. No.: 11/487,115

(22) Filed: Jul. 14, 2006

(65) Prior Publication Data

US 2008/0014884 A1    Jan. 17, 2008

(51) Int. Cl.
H04B 7/02    (2006.01)
H04L 1/02    (2006.01)

(52) U.S. Cl. .............. 375/267; 375/299; 375/260; 375/130; 455/500; 455/101; 370/329; 370/330

(58) Field of Classification Search .......... 375/267, 375/299, 260, 130; 455/500, 101; 370/329, 370/330
See application file for complete search history.

(56) References Cited

U.S. PATENT DOCUMENTS

| 2006/0120477 A1* | 6/2006 | Shen et al. ............ 375/267 |
| 2007/0183533 A1* | 8/2007 | Schmidl et al. ........ 375/299 |
| 2008/0049672 A1* | 2/2008 | Barak et al. .......... 370/330 |

OTHER PUBLICATIONS

Janani, Mohammad, et al., "Coded Cooperation with Space-Time Transmission and Iterative Decoding", *Multimedia Communications Laboratory*, The University at Texas at Dallas, 5 pages.
Nosratinia, Aria, et al., "Cooperative Communication in Wireless Networks", *IEEE Communications Magazine*, (Oct. 2004), 7 pages.
Sendonaris, Andrew, et al., "Increasing Uplink Capacity via User Cooperation Diversity", *IEEE*, (1998), 1 page.

\* cited by examiner

*Primary Examiner*—Phuong Phu
(74) *Attorney, Agent, or Firm*—The Law Offices of John C. Scott, LLC; John C. Scott

(57) ABSTRACT

Multiple wireless user devices act cooperatively to communicate with a remote destination node through a MIMO channel. In at least one embodiment, a cooperative cluster of user devices is formed that makes use of vertical coding techniques to achieve enhanced communication performance.

21 Claims, 7 Drawing Sheets

US 7,623,589 B2

COOPERATIVE MULTIPLE-ACCESS USING USER-CLUSTERING AND SPACE-TIME-FREQUENCY CODING TECHNIQUES FOR HIGHER RELIABILITY RECEPTION

TECHNICAL FIELD

The invention relates generally to wireless communication and, more particularly, to techniques for providing multiple access in a wireless system.

BACKGROUND OF THE INVENTION

Wireless communication systems are experiencing an explosive growth in popularity and the demand for wireless services is increasing. As such, it is envisioned that the data rates of future wireless systems will have to increase significantly. One performance enhancing technology that has been successfully used in wireless systems is multiple input, multiple output or MIMO. In a MIMO system, multiple antennas are used at each side of a wireless communication link. Thus, a transmitting device uses multiple transmit antennas to transmit data to a receiving device and the receiving device uses multiple receive antennas to receive the transmitted data. The use of MIMO technology is capable of improving spectral efficiency, link reliability, and power efficiency in a system by providing spatial multiplexing gain, diversity gain, and array gain, respectively. However, as described above, MIMO typically requires each device in the system to have multiple antennas. In some systems, it is impractical to provide multiple antennas within each communication device. Techniques are needed that allow the advantages of MIMO to be achieved within systems using single antenna devices.

DETAILED DESCRIPTION

Figure 1:
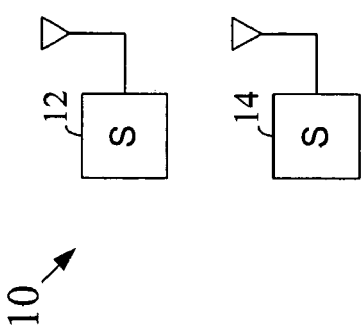
FIG. 1 is a block diagram illustrating a conventional multi-user wireless network arrangement.
Figure 1:
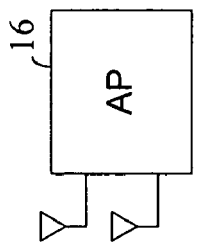

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention relates to techniques for providing cooperative operation among wireless devices within a network to increase the number of antennas that are used to transmit data to a remote wireless entity. In this manner, multiple single antenna devices may cooperate with one another to appear as a single multiple antenna device so that many of the benefits of MIMO operation may be achieved. The inventive techniques may be implemented by both single antenna and multiple antenna devices. In addition, the inventive techniques may be used within wireless local area networks (LANs), wireless wide area networks (WANs), wireless municipal area networks (MANs), local multipoint distribution service (LMDS) systems, multichannel multipoint distribution service (MMDS) systems, wireless cellular telephone networks, terrestrial wireless communication networks, satellite communication networks, and/or other types of wireless systems and networks.

FIG. 1 is a block diagram illustrating a conventional multi-user wireless network arrangement 10. As shown, first and second wireless user devices 12, 14 are each communicating with an access point (or base station) 16 in a multiple access relationship. The AP 16 has finite communication resources available to it for use in servicing users and must allocate these resources amongst the current users. Resources may be allocated in a variety of different ways in a multiple access system. Some techniques for allocating resources include time division multiple access (TDMA) where one or more time slots are allocated to each active user, frequency division multiple access (FDMA) where one or more frequency channels are allocated to each user, code division multiple access (CDMA) where one or more spread spectrum codes may be allocated to each user, orthogonal frequency division multiple access (OFDMA) where a subgroup of subcarriers may be allocated to each user, spatial division multiple access (SDMA) where a common resource may be allocated to two different users concurrently as long as spatially separated antenna beams are used for the two users, and carrier sense multiple access with collision avoidance (CSMA-CA) where users first check to see if a medium is currently busy, transmit if it is not busy, and re-transmit if a collision occurs. Combinations of the above techniques may also be used. All of these techniques require the different users to "compete" for available resources.

The present invention relates to a technique that will be referred to herein as cooperative multiple access. Cooperative multiple access allows multiple users to form cooperative clusters that communicate as a single entity with a remote destination device (e.g., a base station, an access point, etc.).

By cooperating with one another, the devices in the cluster are no longer in competition with each other for communication resources. Instead, the cooperating devices are assigned a single resource allocation that they may use cooperatively as if they were a single device. Even if the cooperating devices are single antenna devices, the cooperative arrangement allows the devices to achieve many of the benefits of MIMO based wireless operation (e.g., spatial multiplexing gain, diversity gain, array gain, etc.). The cooperating devices within a cluster may include all single antenna devices, all multi-antenna devices, or a combination of single and multi-antenna devices.

Figure 2:
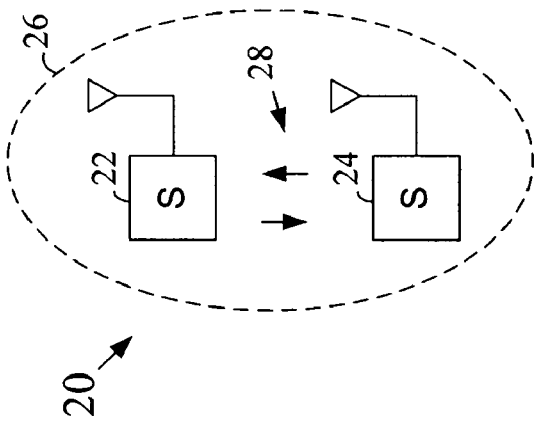
FIG. 2 is a block diagram illustrating an example cooperative multiple access arrangement in accordance with an embodiment of the present invention.
Figure 2:
Figure 2:
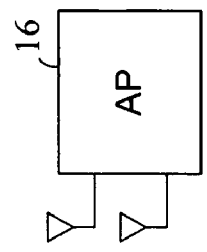

FIG. 2 is a block diagram illustrating an example cooperative multiple access arrangement 20 in accordance with an embodiment of the present invention. As shown, first and second wireless user devices 22, 24 have affiliated with one another as a cooperative cluster 26 to communicate with a remote wireless access point 16. As will be described in greater detail, the cooperating devices 22, 24 may communicate with one another via intra-cluster wireless links 28. The cluster 26 may then transmit data to the AP 16 as a single MIMO type unit, via a MIMO channel. This technique may be referred to as MIMO-single user (MIMO-SU). The cluster 26 may utilize a common time/frequency resource allocated by the AP 16 (resource allocation techniques such as, for example, OFDMA, OFDM-TDMA, and/or others may be used). After reception, the AP 16 may demodulate and decode the data from the cluster 26 and separate out the data associated with each of the cooperating devices 22, 24. In at least one embodiment, the receiver within the AP 16 uses a conventional MIMO receiver design. The AP 16 may be able to support other non-cooperating wireless devices and/or other clusters at the same time that it is supporting the cooperative cluster 26. As will be described in greater detail, in at least one embodiment of the present invention, a cooperative multiple access scheme is provided that uses vertical encoding techniques to perform space-time-frequency coding within a wireless network arrangement.

Channel coding is typically performed in one of two ways in a MIMO based system: as horizontal encoding or vertical encoding. These two techniques differ in the way they exploit the space dimension. For example, horizontal encoding first demultiplexes an incoming bit stream into multiple sub-streams and then performs time-frequency coding and interleaving on the individual sub-streams before mapping bits into symbols and transmitting. Vertical encoding, on the other hand, first time-frequency codes and interleaves an incoming bit stream and then demultiplexes the stream into sub-streams. The sub-streams are mapped into symbols that may then be transmitted by corresponding antennas. Therefore, vertical encoding provides more coding protection on the data through space-time-frequency dimensions, while with horizontal encoding only time-frequency coding protects the data. On the other hand, horizontal encoding allows simpler receive processing to be performed in the receiver, as each data stream may be decoded separately. Vertical encoding generally requires more complex receive processing because joint decoding is typically required. However, vertical encoding is capable of improved diversity gain as each data bit can be spread across all of the transmit antennas. During reception for both schemes, relatively simple linear receiver may be used at the RF front end to separate the spatially coupled received signals, such as a Minimum Mean Square Error (MMSE) receiver or a Zero Forcing receiver.

Figure 3:
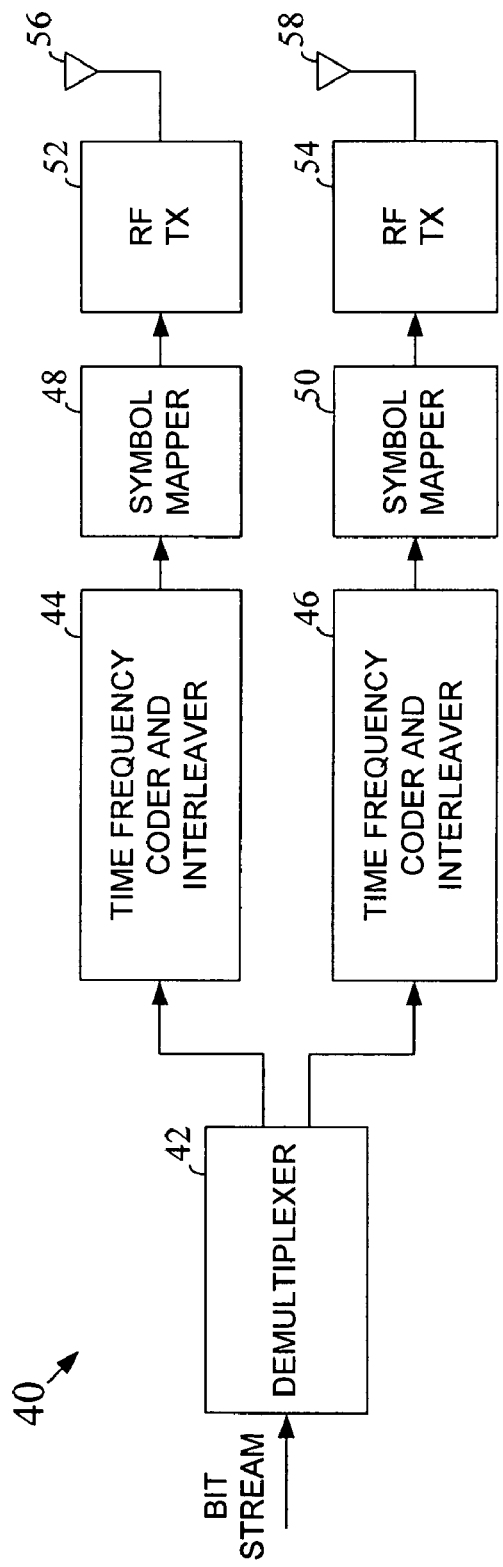
FIG. 3 is a block diagram illustrating an example MIMO transmitter arrangement using horizontal encoding.

FIG. 3 is a block diagram illustrating an example MIMO transmitter arrangement 40 using horizontal encoding. As shown, the transmitter arrangement 40 includes: a demultiplexer 42, first and second time-frequency coder/interleavers 44, 46, first and second symbol mappers 48, 50, and first and second radio frequency (RF) transmitters 52, 54. The first and second RF transmitters 52, 54 may each have one or more transmit antennas 56, 58 coupled thereto to facilitate the transmission of signals onto the wireless medium. The demultiplexer 42 receives an input bit stream and demultiplexes it into two separate sub-streams. Each sub-stream is delivered to a corresponding time-frequency coder/interleaver 44, 46 to be time-frequency coded and interleaved. The bits within the coded streams output by the first and second time-frequency coder/interleavers 44, 46 are then mapped into symbols within the first and second symbol mappers 48, 50, respectively, based on a predetermined modulation scheme (e.g., BPSK, QPSK, 16 QAM, etc.). The symbols may then be transmitted by the first and second RF transmitters 52, 54.

Figure 4:
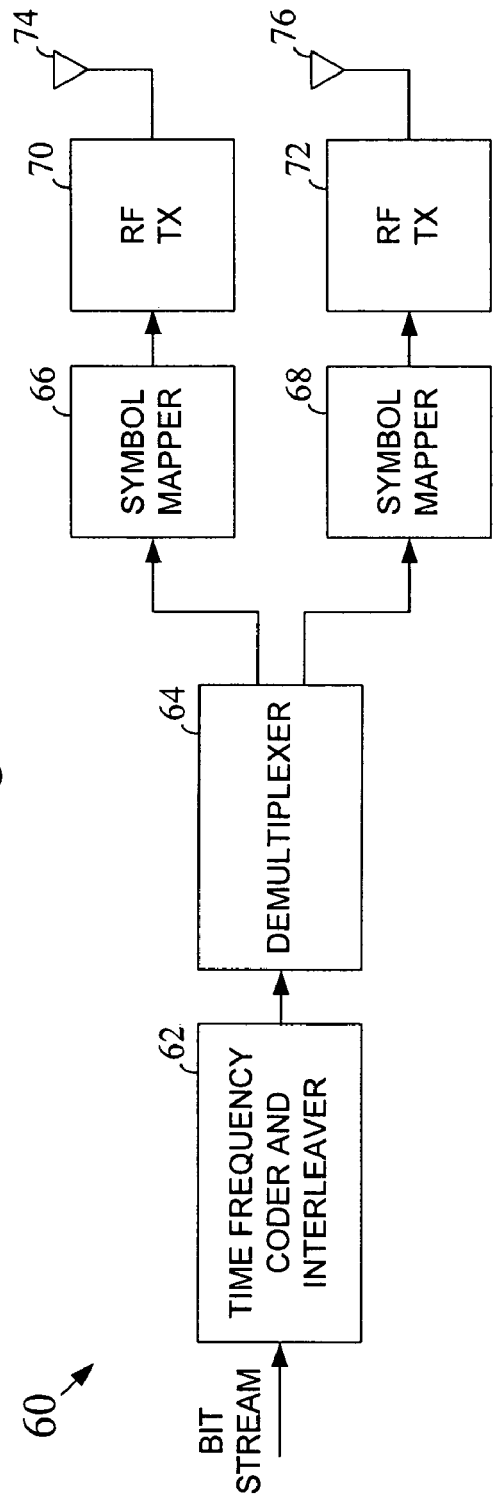
FIG. 4 is a block diagram illustrating an example MIMO transmitter arrangement using vertical encoding.

FIG. 4 is a block diagram illustrating an example MIMO transmitter arrangement 60 using vertical encoding. As shown, the transmitter arrangement 60 includes: a time-frequency coder/interleaver 62, a demultiplexer 64, first and second symbol mappers 66, 68, and first and second RF transmitters 70, 72. As before, the first and second RF transmitters 70, 72 may each have one or more transmit antennas 74, 76 coupled thereto to facilitate the transmission of signals onto the wireless medium. The time-frequency coder/interleaver 62 time-frequency codes and interleaves the input bit stream before demultiplexing. The demultiplexer 64 then demultiplexes the bit stream into two sub-streams. Each sub-stream is then mapped into symbols within a corresponding symbol mapper 66, 68 and the symbols are transmitted by the RF transmitters 70, 72. As will be described in greater detail, in at least one embodiment of the present invention, techniques are provided for use in implementing vertical encoding within a cooperative cluster as part of cooperative multiple access scheme.

In the examples discussed above, MIMO-based devices are shown that include two antennas. It should be appreciated that a device (or cluster) may include any number of antennas greater than one to support MIMO operation. In addition, any number of devices may be assembled into a cooperative cluster. However, a point may be reached where adding further user devices to a cluster provides no additional performance gain. The devices in a cluster may each have one or more antennas.

Figure 5:
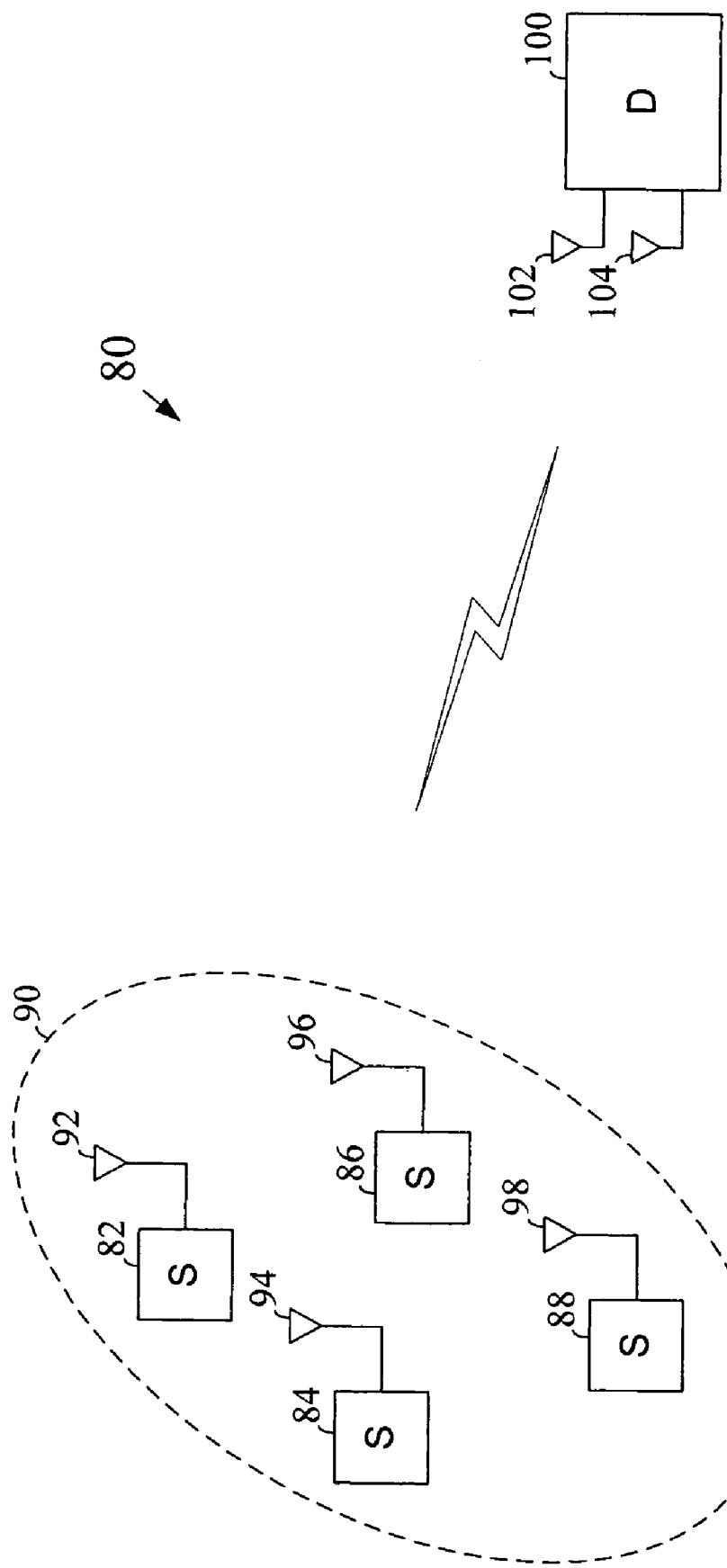
FIG. 5 is a block diagram illustrating an example cooperative multiple access wireless network arrangement in accordance with an embodiment of the present invention.

FIG. 5 is a block diagram illustrating an example cooperative multiple access wireless network arrangement 80 in accordance with an embodiment of the present invention. As shown, the arrangement 80 includes a number of wireless user devices 82, 84, 86, 88 that are acting cooperatively as a cooperative cluster 90. The cluster 90 is communicating with a remote wireless destination node 100 through a MIMO channel. The destination node 100 may include, for example, a wireless access point (AP), a base station (BS), or any other type of wireless device or system that communicates with multiple external wireless devices simultaneously. The destination node 100 includes multiple antennas 102, 104. Any number of antennas may be used. In addition to the cluster 90, the destination node 100 may be communicating with other devices and/or clusters concurrently. Any type of wireless user devices may be formed into a cluster including, for example, computers having wireless capability, personal digital assistants (PDAs) having wireless capability, cellular telephones and other handheld wireless communicators, and/or others. In addition, in at least one embodiment, a single cooperative cluster may include different types of wireless user devices. For example, a cluster may include a cellular telephone and a PDA that cooperate to transmit data to a remote base station. Each wireless user device 82, 84, 86, 88 in the cluster 90 includes at least one corresponding antenna 92, 94, 96, 98. Any type of antenna(s) may be used including, for example, a dipole, a patch, a helical antenna, and/or others.

Before a cluster 90 is able to communicate with a destination node 100, the cluster must be formed. As described previously, the devices within a cooperative cluster will communicate with one another using intra-cluster wireless links. These intra-cluster links should be high quality links (e.g., high signal to noise ratios (SNRs), etc.) that are capable of relatively high data rates. When high quality links exist between the cooperating users, the users are able to exchange packets with little cost in terms of power and bandwidth. Therefore, in at least embodiment, only wireless users devices that are capable of supporting high quality links with one another will be allowed to form a cluster. For example, a user device may only be allowed to join a particular cluster if a channel quality parameter associated with the device satisfies a predetermined condition (e.g., a channel coefficient for a channel between the device and the other devices in the cluster is greater than a threshold value). In one possible approach, a user device may be designated as a master for a cluster to control the formation of the group. This may be, for example, a first device that indicates a desire to form a cluster. The master device may then allow other devices to join the cluster if they qualify. Measurements may be made of a channel quality of each candidate device with respect to each other device within the cluster. In some embodiments, there may be a maximum number of devices that will be permitted to join a cluster. Other techniques for establishing the cluster may alternatively be used.

The devices within a cluster will often be located much closer to one another than to the destination node (e.g., $D_c \ll D_n$, where $D_c$ is the maximum distance between devices within the cluster and $D_n$ is the minimum distance between a device in the cluster and the destination node). While the intra-cluster wireless links are high quality links, the channel between the cluster and the remote destination node 100 may suffer from effects such as path loss, shadowing, and multipath fading. It is assumed that quasi-static channel conditions exist for all devices within the network arrangement. That is, the channel coherence time for all of the links is much larger than the frame duration and the channel coherence bandwidth is comparable in magnitude to the transmit signal bandwidth.

Figure 6:
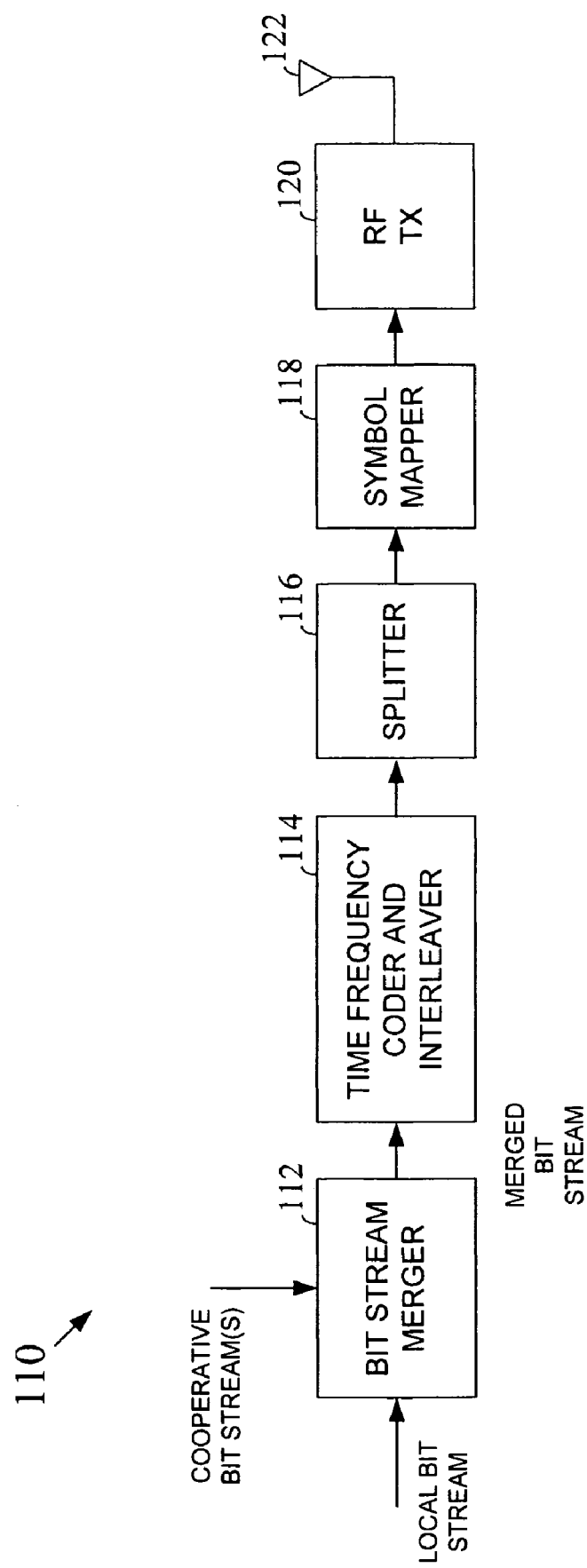
FIG. 6 is a block diagram illustrating an example transmitter system in accordance with an embodiment of the present invention.

FIG. 6 is a block diagram illustrating an example transmitter system 110 in accordance with an embodiment of the present invention. The transmitter system 110 may be used within, for example, a wireless user device that is to join a cooperative cluster in a cooperative multiple access system (e.g., device 86 in FIG. 5, etc.). The transmitter system 110 is capable of supporting vertical encoding within a cooperative cluster in a wireless network in cooperation with the other devices of the cluster. As shown, the transmitter system 110 may include: a bit stream merger 112, a time-frequency coder and interleaver 114, a splitter 116, a symbol mapper 118, and an RF transmitter 120. The RF transmitter 120 may be coupled to one or more antennas 122 to facilitate the transmission of signals onto the wireless channel.

In at least one embodiment of the present invention, before data is transmitted to a destination node by a cooperative cluster, the devices of the cluster exchange data messages that they wish to transmit to the destination node. After this data exchange, each of the devices of the cluster have the messages of the other devices in the cluster. The bit stream merger 112 within a particular device merges the bit streams of the other device(s) within the cooperative cluster with the bit stream of the device itself to form a merged bit stream. Each of the other devices within the cooperative cluster also merge the bit streams together in the same fashion. A priority scheme may be established so that each device knows the order with which to merge the bit streams. The merged bit stream is next processed by the time-frequency coder and interleaver 114, which applies time-frequency coding and interleaving to the stream to generate a coded bit stream. Although illustrated as a single unit, it should be appreciated that, in at least one embodiment, the time-frequency coding and interleaving may be performed separately. Each device within the cooperative cluster will apply the identical time-frequency code at this stage.

Figure 7:
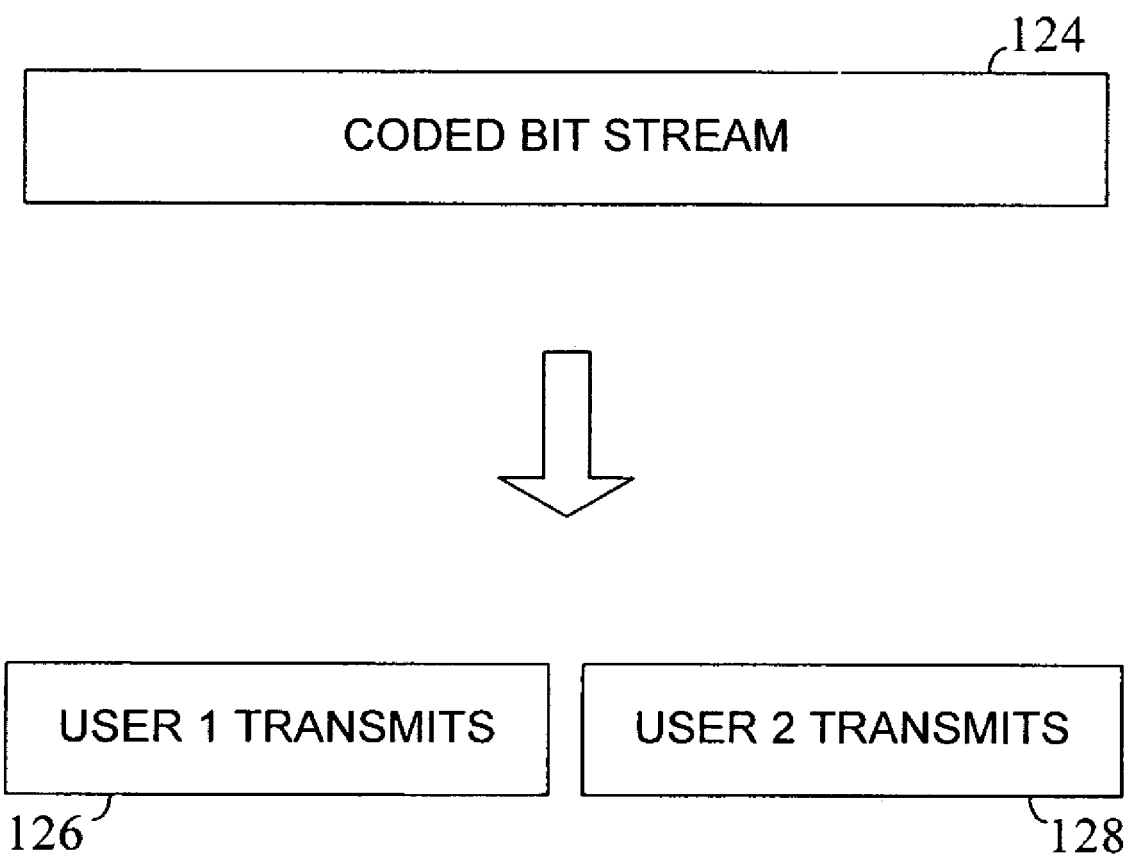
FIG. 7 is a diagram illustrating an example splitting procedure for a coded bit stream in a wireless user device in accordance with an embodiment of the present invention.

The splitter 116 takes the coded bit stream and splits it into multiple portions. One of the portions will be transmitted by the transmitter system 110 and the other portion(s) will be discarded. Similarly, the splitter in each of the other user devices in the cooperative cluster may split a corresponding coded bit stream in the same manner. However, the other user devices may each transmit a different portion of the split stream and discard the remaining portions. FIG. 7 is a diagram illustrating the operation of the splitter 116 in a wireless user device, for a cooperative cluster having two cooperating devices, in accordance with an embodiment of the present invention. The wireless user device first generates a coded bit stream 124 as described above. The coded bit stream 124 is then split into two portions 126 and 128. The wireless user device transmits a first portion 126 and discards the second portion 128. The other wireless user device in the cluster also generates the same coded bit stream 124 and performs the split. However, the other device transmits the second portion 128 and discards the first portion 126. The two wireless user devices may transmit their respective portions at the same time. A similar approach may be taken for clusters having more than two wireless user devices. In at least one embodiment, the number of portions that the encoded bit stream is split into will equal the number of user devices within the cooperative cluster. Other techniques for splitting the coded bit stream may alternatively be used.

Referring back to FIG. 6, the symbol mapper 118 receives the portion of the coded bit stream to be transmitted and maps the bits to symbols in accordance with a predetermined modulation scheme. The symbols are then delivered to the RF transmitter 120 which may upconvert the symbols and amplify them before feeding them to the antenna 122 for transmission onto the wireless channel.

In at least one embodiment of the present invention, the bit stream merging and the time frequency coding and interleaving discussed above are performed within a single device in the cluster. The resulting coded bit stream is then transmitted (e.g., broadcast, etc.) to all of the devices within the cluster. The individual devices in the cluster may then perform their corresponding splitting and transmit operations as discussed previously. In one implementation, additional coding is used to protect the coded stream over the intra-cluster link(s) so that each device receives the correct version of the coded bits.

Figure 8:
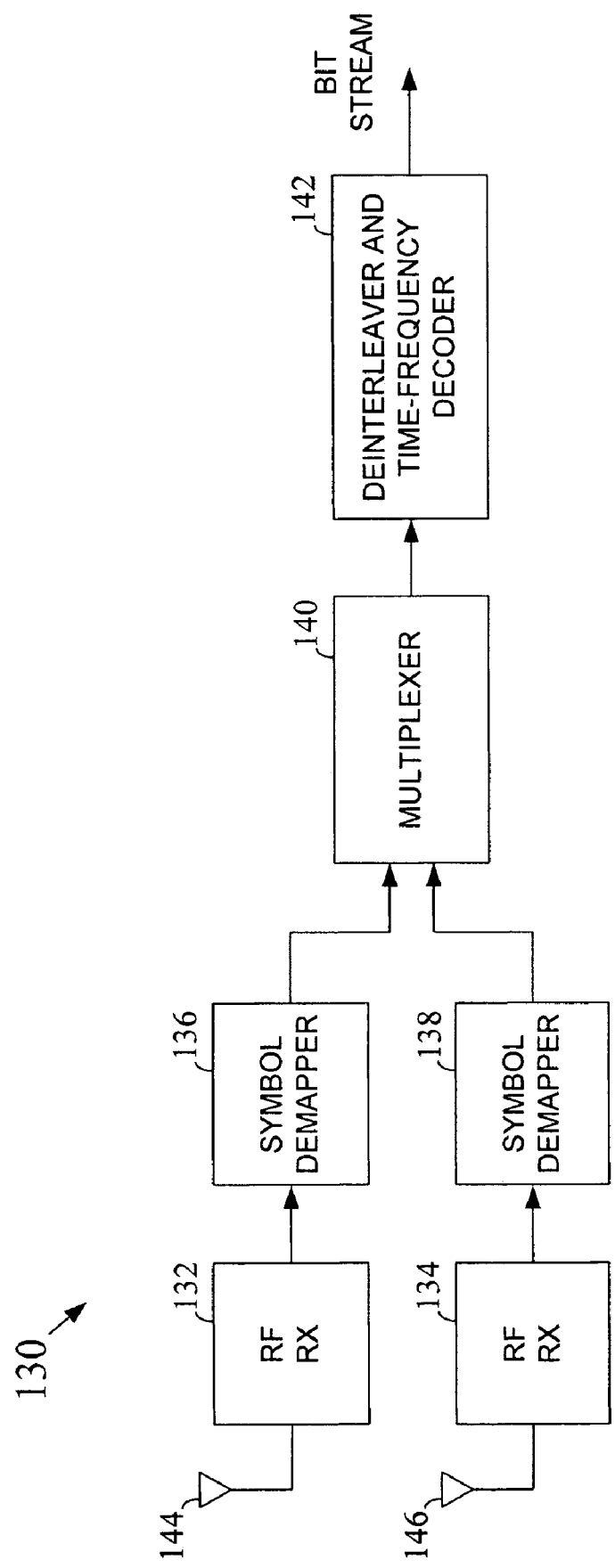
FIG. 8 is a block diagram illustrating an example receiver system that is capable of receiving transmissions from a cooperative cluster in accordance with an embodiment of the present invention.

FIG. 8 is a block diagram illustrating an example receiver system 130 that is capable of receiving transmissions from a cooperative cluster in accordance with an embodiment of the present invention. The receiver system 130 is a conventional MIMO receiver that is also capable of receiving vertically encoded signals from a single MIMO-based user device having multiple transmit antennas. As shown, the receiver system 130 may include: first and second RF receivers 132, 134, first and second symbol demappers 136, 138, a multiplexer 140, and a deinterleaver and time-frequency decoder 142. The first and second RF receivers 132, 134 may each be coupled to a corresponding receive antenna 144, 146 to facilitate the reception of signals from the wireless medium. When a cooperative cluster transmits signals to the receiver system 130, the first and second RF receivers 132, 134 receive the signals and convert them to a baseband representation. The first and second symbol demappers 136, 138 then demap the signals to soft bits. The multiplexer 140 then multiplexes the outputs of the signal demappers 136, 138 into a single stream. The single stream is then deinterleaved and time-frequency decoded within the deinterleaver and time-frequency decoder 142 to generate a decoded bit stream. The decoded bit stream may be a merged bit stream including portions associated with each of the user devices within the originating cooperative cluster. The receiver system 130 may also include functionality for separating this merged bit stream into individual streams associated with each of the cooperating users. Substantially the same processing may be performed when a single MIMO-based device transmits data to the receiver system 130, except that there will be no need to separate merged streams.

Figure 9:
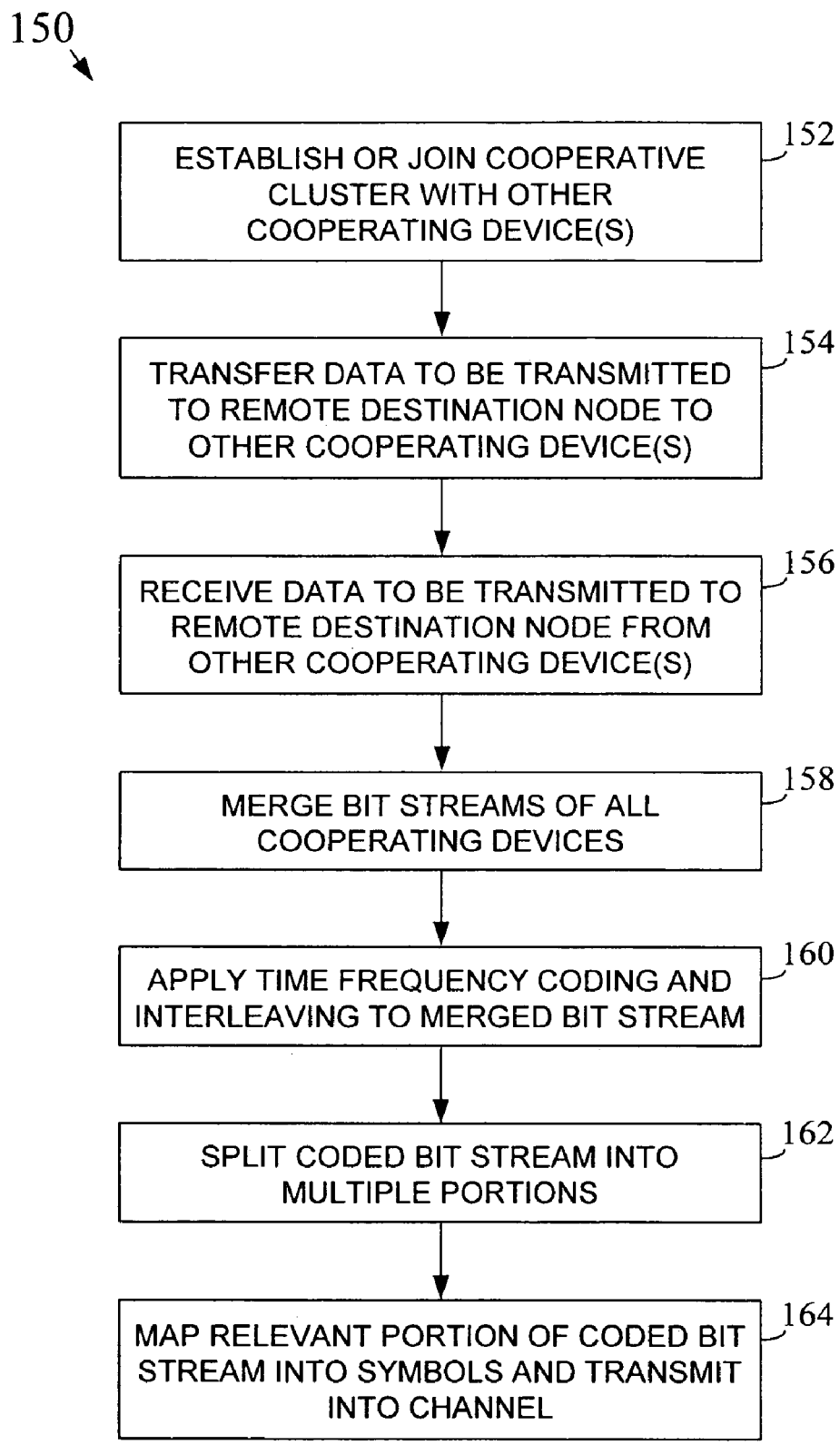
FIG. 9 is a flowchart illustrating an example method for operating a wireless user device in a cooperative multiple access mode in accordance with an embodiment of the present invention.

FIG. 9 is a flowchart illustrating an example method 150 for operating a user device in a cooperative multiple access mode in accordance with an embodiment of the present invention. First, a user device establishes or joins a cooperative cluster of user devices that need to uplink data to a remote destination node (block 152). Any number of devices (i.e., 2 or more) may be part of the cluster. After the cluster has been formed, the user device transfers its data message, that needs to be sent to the destination node, to the cooperating devices in the cluster (block 154). Similarly, the user device may receive at least one data message from one or more (or all) of the other cooperating devices within the cluster that needs to be delivered to the destination node (block 156). This data transfer between cooperating nodes may be performed using intra-cluster wireless links.

The data messages from the cooperating devices are next merged within the user device to form a merged bit stream (block 158). The merger may be performed, for example, by concatenating the various bit streams in a predetermined manner. The same merger of messages may be performed in each of the other cooperating devices to generate the same merged bit stream. The merged bit stream is then time-frequency coded and interleaved within the user device to generate a coded bit stream (block 160). The merged bit stream is also encoded in the other cooperating devices using the same time-frequency code and interleaving scheme. The coded bit stream is split into multiple portions within the user device (block 162). One of the portions is then mapped into symbols and transmitted into the wireless channel (block 164). The other user devices within the cooperative cluster also split the coded bit stream into multiple portions, but they each transmit a different portion into the wireless channel. The splitting operation within each cooperating device is meant to achieve a similar function to the demultiplexer 64 in the MIMO transmitter arrangement 60 of FIG. 4 (that uses vertical encoding), but in a distributed manner. In at least one embodiment, the resulting transmission from all of the user devices within the cooperative cluster will be substantially the same as a transmission by a single MIMO based device having an equivalent number of antennas.

In at least one embodiment, a different frequency band is used within the intra-cluster wireless links than is used within the MIMO channel to the destination device. In this manner, the intra-cluster communications will not generate a bandwidth penalty within the primary communication network. For example, in one possible implementation, each wireless user device within a cluster may include both an IEEE 802.11a radio and a Bluetooth radio. The Bluetooth radios may be used to support the intra-cluster links, while IEEE 802.11a radios provide communication with the remote destination node. The communications using the Bluetooth radio will not generate a bandwidth penalty within the IEEE 802.11a network. In other embodiments, the same frequency band may be used for the intra-cluster links that is used for the primary network. For example, in one possible implementation, each of the cooperating devices may include only an IEEE 802.11a radio. The devices may then use this radio for both intra-cluster communication and communication with the remote destination node. As will be appreciated, many different alternatives may be used for supporting the intra-cluster communication.

The techniques and structures of the present invention may be implemented in any of a variety of different forms. For example, features of the invention may be embodied within laptop, palmtop, desktop, and tablet computers having wireless capability; personal digital assistants (PDAs) having wireless capability; cellular telephones and other handheld wireless communicators; pagers; satellite communicators; cameras having wireless capability; audio/video devices having wireless capability; network interface cards (NICs) and other network interface structures; base stations; wireless access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. In at least one form, the invention is embodied as a set of instructions that are modulated onto a carrier wave for transmission over a transmission medium. As used herein, the term "logic" may include, by way of example, software or hardware and/or combinations of software and hardware.

It should be appreciated that the individual blocks illustrated in the block diagrams herein may be functional in nature and do not necessarily correspond to discrete hardware elements. For example, in at least one embodiment, two or more of the blocks in a diagram are implemented in software within a single digital processing device. The digital processing device may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method for use with a wireless user device, comprising:

joining a cooperative cluster of wireless user devices, said wireless user devices of said cooperative cluster to act cooperatively to communicate with a remote destination node through a multiple input, multiple output (MIMO) channel;

transferring a first data message to each other wireless user device in said cooperative cluster, said first data message to be transmitted by said cooperative cluster to said remote destination node;

obtaining at least one other data message from one or more other wireless user devices in said cooperative cluster, said at least one other data message to be transmitted by said cooperative cluster to said remote destination node;

merging said first data message and said at least one other data message to form a merged bit stream;

time-frequency coding said merged bit stream using a predetermined time-frequency code and performing interleaving to form a coded bit stream; and splitting said coded bit stream into multiple portions, said multiple portions including a first portion and at least one other portion.

2. The method of claim 1, further comprising:

mapping said first portion of said coded bit stream into symbols; and transmitting said symbols into said MIMO channel.

3. The method of claim 2, further comprising:

discarding said at least one other portion of said coded bit stream.

4. The method of claim 2, wherein:

each other wireless user device in said cooperative cluster generates the same coded bit stream and divides the coded bit stream into multiple portions, but each other wireless device maps a different portion of the coded bit stream to symbols for transmission into the MIMO channel, wherein all wireless user devices in said cooperative cluster transmit corresponding symbols at substantially the same time.

5. The method of claim 1, wherein:

transferring a first data message to each other wireless user device in said cooperative cluster includes transmitting said first data message using an intra-cluster wireless link.

6. The method of claim 5, wherein:

said intra-cluster wireless link uses a different frequency band than is used within said MIMO channel.

7. The method of claim 5, wherein:

said intra-cluster wireless link uses a different wireless network technology than is used within said MIMO channel.

8. The method of claim 5, wherein:

obtaining at least one other data message from one or more other wireless user devices in said cooperative cluster includes receiving said at least one other data message via intra-cluster wireless link.

9. The method of claim 1, wherein:

obtaining at least one other data message from one or more other wireless user devices in said cooperative cluster includes obtaining a data message from all other wireless user devices in said cooperative cluster.

10. The method of claim 1, wherein:

splitting said coded bit stream into multiple portions includes splitting said coded bit stream into N portions, where N is the number of wireless user devices within said cooperative cluster.

11. A wireless apparatus, comprising:

a bit stream merger to merge a bit stream of the wireless apparatus with at least one bit stream associated with another device in a common cooperative cluster as the wireless apparatus to form a merged bit stream, wherein said bit stream of said wireless apparatus and said at least one bit stream are to be transmitted to a remote destination device by the cooperative cluster, via a MIMO channel;

a time-frequency coder and interleaver to time-frequency code and interleave said merged bit stream to generate a coded bit stream;

a splitter to split said coded bit stream into multiple portions, said multiple portions including a first portion and at least one other portion; and a symbol mapper to map said first portion of said coded bit stream to symbols; and an RF transmitter to transmit said symbols into said MIMO channel.

12. The apparatus of claim 11, wherein:

said splitter discards said at least one other portion of said coded bit stream.

13. The apparatus of claim 11, further comprising:

a wireless receiver to receive said at least one bit stream from a corresponding device via an intra-cluster wireless link.

14. The apparatus of claim 13, wherein:

said wireless receiver is operative within a different frequency band from said RF transmitter.

15. The apparatus of claim 11, wherein:

said splitter splits said coded bit stream into N portions, where N is the number of wireless user devices within said cooperative cluster.

16. An article comprising a storage medium having instructions stored thereon that, when executed by a computing platform, operate to:

transfer a first data message from a first wireless user device in a cooperative cluster to each other wireless user device in said cooperative cluster, wherein said wireless user devices of said cooperative cluster are to act cooperatively to communicate with a remote destination node through a multiple input, multiple output (MIMO) channel, said first data message to be transmitted by said cooperative cluster to said remote destination node;

obtain at least one other data message from one or more other wireless user devices in said cooperative cluster, said at least one other data message to be transmitted by said cooperative cluster to said remote destination node;

merge said first data message and said at least one other data message to form a merged bit stream;

time-frequency code said merged bit stream using a predetermined time-frequency code and perform interleaving to form a coded bit stream; and split said coded bit stream into multiple portions, said multiple portions including a first portion and at least one other portion.

17. The article of claim 16, wherein said instructions further operate to:

map said first portion of said coded bit stream into symbols; and deliver said symbols to a wireless transmitter for transmission into said MIMO channel.

18. The article of claim 16, wherein said instructions further operate to:

discard said at least one other portion of said coded bit stream.

19. A wireless system comprising:

at least one dipole antenna;

a bit stream merger to merge a bit stream of the wireless system with at least one bit stream associated with another device in a common cooperative cluster as the wireless system to form a merged bit stream, wherein said bit stream of said wireless system and said at least one bit stream are to be transmitted to a remote destination device by the cooperative cluster, via a MIMO channel;

a time-frequency coder and interleaver to time-frequency code and interleave said merged bit stream to generate a coded bit stream;

a splitter to split said coded bit stream into multiple portions, said multiple portions including a first portion and at least one other portion; and a symbol mapper to map said first portion of said coded bit stream to symbols; and an RF transmitter, coupled to said at least one dipole antenna, to transmit said symbols into said MIMO channel using said at least one dipole antenna.

20. The wireless system of claim 19, wherein:

said splitter discards said at least one other portion of said coded bit stream.

21. The wireless system of claim 19, wherein:

said splitter splits said coded bit stream into N portions, where N is the number of wireless user devices within said cooperative cluster.

* * * * *

UNITED STATES PATENT AND TRADEMARK OFFICE
CERTIFICATE OF CORRECTION

PATENT NO. : 7,623,589 B2  Page 1 of 1
APPLICATION NO. : 11/487115
DATED : November 24, 2009
INVENTOR(S) : Oyman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 802 days.

Signed and Sealed this

Twenty-sixth Day of October, 2010

David J. Kappos
*Director of the United States Patent and Trademark Office*